United States Patent
Hummel, III et al.

(10) Patent No.: US 7,913,435 B1
(45) Date of Patent: Mar. 29, 2011

(54) VEHICLE DISPLAY BRACKET SYSTEM

(76) Inventors: John F. Hummel, III, Tarpon Springs, FL (US); Mark E. Robinson, Tarpon Springs, FL (US)

(*) Notice: Subject to any disclaimer, the term of this patent is extended or adjusted under 35 U.S.C. 154(b) by 323 days.

(21) Appl. No.: 11/542,036

(22) Filed: Sep. 28, 2006

Related U.S. Application Data (60) Provisional application No. 60/721,243, filed on Sep. 28, 2005.

(51) Int. Cl.
G09F 7/00 (2006.01)

(52) U.S. Cl. .................................. 40/210; 40/211

(58) Field of Classification Search .................. 40/210, 40/211, 424, 591; 280/477; D12/400
See application file for complete search history.

(56) References Cited

U.S. PATENT DOCUMENTS

| | | | |
|---|---|---|---|
| 1,250,543 A * | 12/1917 | Bartolomeo | 40/201 |
| 1,899,971 A * | 3/1933 | Meehan | 264/131 |
| 2,226,159 A * | 12/1940 | De Hoffmann | 359/526 |
| 2,591,196 A * | 4/1952 | Post | 40/211 |
| 2,880,535 A * | 4/1959 | Bryant | 40/210 |
| 2,988,383 A | 6/1961 | Carson | |
| 3,891,237 A | 6/1975 | Allen | |
| 3,908,296 A * | 9/1975 | Harrison | 40/210 |
| 4,759,564 A | 7/1988 | Williams, Jr. | |
| 5,011,176 A | 4/1991 | Eppinette | |
| 5,027,537 A * | 7/1991 | Freeman et al. | 40/210 |
| 5,277,447 A | 1/1994 | Blaser | |
| 5,732,927 A * | 3/1998 | Purpura | 248/539 |
| D399,802 S | 10/1998 | Adelaar | |
| D402,599 S | 12/1998 | Adelaar | |
| D402,601 S | 12/1998 | Julian | |
| D404,349 S | 1/1999 | Julian | |
| D404,696 S | 1/1999 | Julian | |
| D409,537 S | 5/1999 | Adelaar | |
| D415,080 S | 10/1999 | Schultz | |
| D417,177 S | 11/1999 | Contreras | |
| D429,668 S | 8/2000 | Julian | |
| D430,520 S | 9/2000 | Benoun | |
| D435,812 S | 1/2001 | Nace | |
| D436,065 S | 1/2001 | Peng | |
| D444,111 S | 6/2001 | Gross | |
| 6,318,288 B1 * | 11/2001 | Aspinwall et al. | 116/30 |
| D454,524 S | 3/2002 | Wrob | |
| 6,381,886 B1 * | 5/2002 | Chou | 40/209 |
| D462,303 S | 9/2002 | Swiggart | |
| 6,796,060 B1 * | 9/2004 | Meester et al. | 40/210 |
| 6,852,314 B1 * | 2/2005 | Samaritani et al. | 424/85.6 |
| 2003/0061749 A1 * | 4/2003 | Bryant | 40/591 |
| 2007/0209245 A1 * | 9/2007 | Stracuzzi | 40/210 |

* cited by examiner

*Primary Examiner* — Cassandra Davis
(74) *Attorney, Agent, or Firm* — David P. Lhota, Esq.; Malin Haley DiMaggio Bowen & Lhota, P.A.

(57) ABSTRACT

A vehicle display bracket system for mounting and displaying three-dimensional ornamental objects on the back or front of a comprising at least one and preferably a plurality of three-dimensional ornamental designs having an exterior threaded post for facilitating mounting to a bracket system comprising a bottom support plate, top plate rotatably mounted to the bottom support plate, rod, mounting aperture defined by the top plate for mounting any of the various ornamental attachments a plurality of gear teeth and grooves for fixing the top plate at a desired angle relative to the support plate.

6 Claims, 13 Drawing Sheets

VEHICLE DISPLAY BRACKET SYSTEM

CROSS REFERENCE TO RELATED APPLICATIONS

This application claims the benefit of provisional patent application Ser. No. 60/721,243 filed Sep. 28, 2005.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

This invention relates generally to an automobile accessory, and more particularly, to a vehicle display bracket system that attaches to license plate fasteners for mounting decorative objects, such as a deer's tail, fish or ball, to a vehicle.

2. Description of the Background Art

Many people like to personalize their automobiles with decorative items, such as personalized license plates, bumper stickers, hitch plugs and window hangings. Given people's interest in personalizing their automobiles, a device and system for conveniently mounting three-dimensional items to a vehicle would be well received. As many vehicles do not have a trailer hitch available, such a device or system should be adapted for mounting to structure other than a vehicle hitch. It would also be desirable to have a wide variety of three-dimensional ornaments that could be mounted to any type of vehicle.

There are many devices known in background art for connecting trailers and ornamental designs to a hitch, as noted below. However, these known devices cannot be used on vehicles that do not have a hitch and do not provide a convenient system for mounting and displaying three-dimensional ornaments on a vehicle as contemplated by the instant invention. For instance, U.S. Pat. No. 2,988,383, issued to Carson, discloses towing bars and draft connections for vehicles. U.S. Pat. No. 3,891,237, issued to Allen, discloses an elongated member, to be connected with a towing vehicle, having an axial socket coaxial with a bell-shaped flange for guiding a shank into the socket whereby a spring urged pawl engages a keeper notch formed in the shank for automatically coupling the traction vehicle to the towed vehicle. U.S. Pat. No. 4,759,564, issued to Williams, Jr., discloses an automatic trailer hitch assembly that mounts a shank unit on the trailer and a receiving unit on the towing vehicle whereby the shank unit provides an elongated shank member that mounts the trailer ball at one end coupled to a conventional trailer hitch ball socket housing secured to the trailer and the opposite end is formed to slide on funnel-like guide passages into the receiving unit. U.S. Pat. No. 5,011,176, issued to Eppinette, discloses a coupling device for connecting a towed vehicle to a towing vehicle in which the towed vehicle has a towing bar that receives a telescopic arm that is pivotally connected to an articulating arm. U.S. Pat. No. 5,277,447, issued to Blaser, discloses a trailer hitch for connecting a towing vehicle and a trailing vehicle, wherein there is a coupling member for each vehicle having a support component and an attachment component.

There are also a number of ornamental designs in the form of hitch plugs and covers. These devices are also incompatible and inoperable with vehicles lacking a hitch. For instance, U.S. Pat. No. Des. 399,802, issued to Adelaar, discloses an ornamental design of a football hitch cover. U.S. Pat. No. Des. 402,599, issued to Adelaar, discloses an ornamental design of a basketball hitch cover. U.S. Pat. No. Des. 402,601, issued to Julian, discloses an ornamental design for a football hitch plug. U.S. Pat. No. Des. 404,349, issued to Julian, discloses an ornamental design for a golf ball hitch plug. U.S. Pat. No. Des. 404,696, issued to Julian, discloses an ornamental design for a baseball hitch plug. U.S. Pat. No. Des. 409,537, issued to Adelaar, discloses an ornamental design of a soccer ball hitch cover. U.S. Pat. No. Des. 415,080, issued to Schultz, discloses an ornamental design for a trailer hitch cover. U.S. Pat. No. Des. 429,668, issued to Julian, discloses an ornamental design for a football hitch plug with a display surface. U.S. Pat. No. Des. 430,520, issued to Benoun, discloses an ornamental design for a hitch insert. U.S. Pat. No. Des. 436,065, issued to Peng, discloses an ornamental design for a trailer golf-ball hitch. U.S. Pat. No. Des. 444,111, issued to Gross, discloses an ornamental design for a trailer hitch insert. U.S. Pat. No. Des. 462,303, issued to Swiggart, discloses an ornamental design for a trailer hitch cover.

Based on the foregoing, there exists a need for a convenient system for mounting and displaying three-dimensional ornaments on vehicles lacking trailer hitches. The instant invention addresses this unfulfilled need in the prior art by providing a vehicle display bracket system for mounting decorative three-dimensional objects to vehicles as contemplated by the instant invention disclosed herein.

BRIEF SUMMARY OF THE INVENTION

In light of the foregoing, it is an object of the present invention to provide three-dimensional ornamental designs adapted for mounting to any vehicle.

It is also an object of the instant invention to provide a bracket system for mounting three-dimensional ornamental designs.

It is another object of the instant invention to provide a bracket system adapted for conveniently interchanging different ornaments.

It is an additional object of the instant invention to provide a vehicle display bracket system that can pivot upward and downward to set the ornament and move it out of the way such as when opening a rear hatch.

It is an additional object of the instant invention to provide a vehicle display bracket system that is cost effective.

In light of these and other objects, the instant invention comprises a vehicle display bracket system for mounting and displaying three-dimensional ornamental objects on the back or front of the vehicle. The vehicle display bracket system comprises at least one and preferably a plurality of three-dimensional ornamental designs, such as a deer tail, fish or ball, and a bracket that mounts over a license plate and secures a selected ornament. The ornament preferably comprises an insert rod, which the ornament is secured to or formed around, having an exterior threaded post. The ornament is secured to the bracket with a washer and nut. The preferred embodiment of the vehicle display bracket system comprises a bottom support plate, top plate rotatably mounted to the bottom support plate, rod and mounting aperture defined by the top plate for mounting any of the various ornamental attachments. The top plate comprises a first hinge having a plurality of gear teeth at one end and a second hinge having gear teeth on one or both ends. The bottom plate comprises a front surface, first hinge having a plurality of gear teeth at one end and second hinge having a plurality of gear teeth at one end. The bottom plate is similar in size and shape to a conventional license plate and is mountable to a vehicle behind the license plate. The rod holds the top and bottom plates together in a manner that facilitates rotation of the top plate relative to the bottom plate. In an alternative embodiment, the bracket comprises a mounting platform with a mounting aperture, at least one and preferably two legs, and an aperture proximal the lower end of each leg to facilitate securing with the license plate hardware.

In accordance with these and other objects, which will become apparent hereinafter, the instant invention will now be described with particular reference to the accompanying drawings.

DETAILED DESCRIPTION OF THE INVENTION

With reference to the drawings, FIGS. 1 to 11 depict the preferred and alternative embodiments of the instant invention which is generally referenced as a bracket system and, or by numeric character 10. The vehicle display bracket systems 10 may be used to mount and display an ornamental object 12 on the back or front of the vehicle. With reference to FIGS. 1-8Q, the vehicle display bracket system 10 comprises a three-dimensional ornamental structure 12, such as one of the three-dimensional structures shown in FIGS. 8A-8R, having an insert rod 14 with a threaded post 16 and washer 18, bracket 20 mountable to license plate fasteners 28, bushing 17 and fastener 19. With reference to FIGS. 9A-11, the preferred embodiment of the vehicle display bracket system 10 comprises a bottom support plate 30, top plate 32 rotatably mounted to the bottom support plate, rod 44 and mounting aperture 34 defined by the top plate 32 for mounting any of the various ornamental attachments 12a-12Q shown in FIGS. 8A-8Q. With reference to FIGS. 1-8, the alternative embodiment of the bracket 20 comprises a mounting platform 22 with a mounting aperture 21, at least one and preferably two legs 24, and an aperture 26 proximal the lower end of each leg 24.

Figure 1:
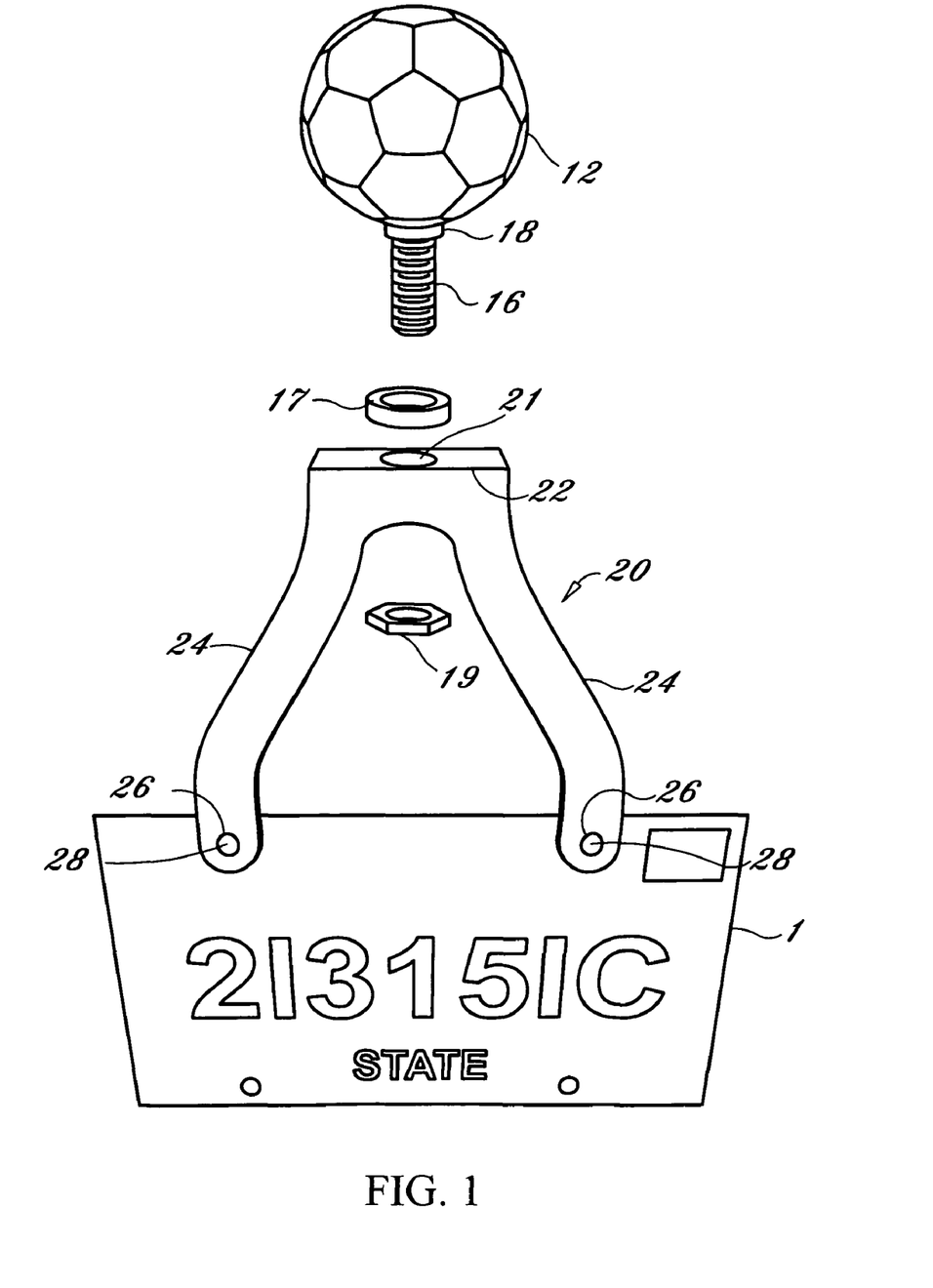
FIG. 1 is a perspective view of the alternative embodiment of the vehicle display bracket system in accordance with the instant invention.
Figure 2:
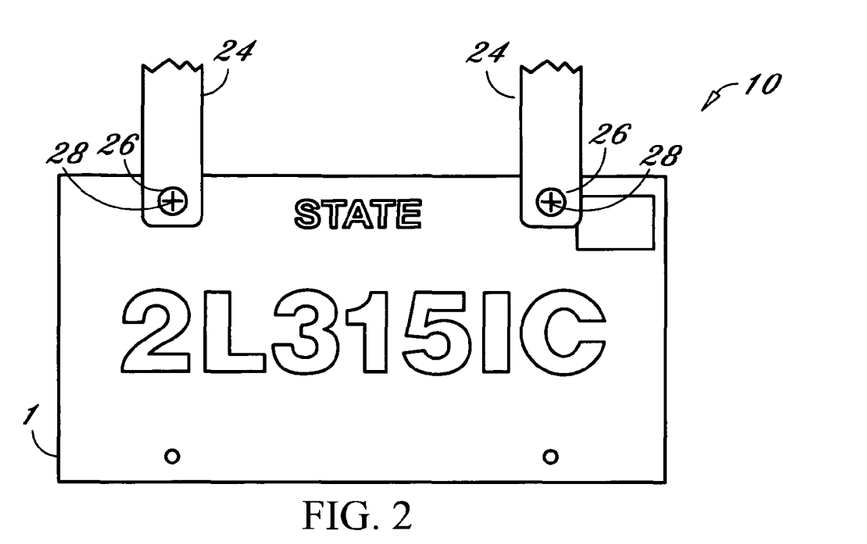
FIG. 2 is a partial elevational view of the alternative embodiment of the vehicle display bracket system attached over a license plate in accordance with the instant invention.
Figure 3:
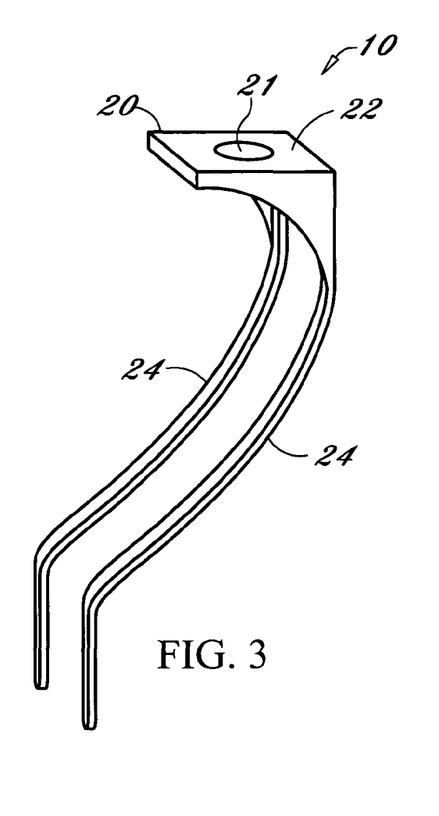
FIG. 3 is a side perspective view of the alternative embodiment of the vehicle display bracket system in accordance with the instant invention.
Figure 4:
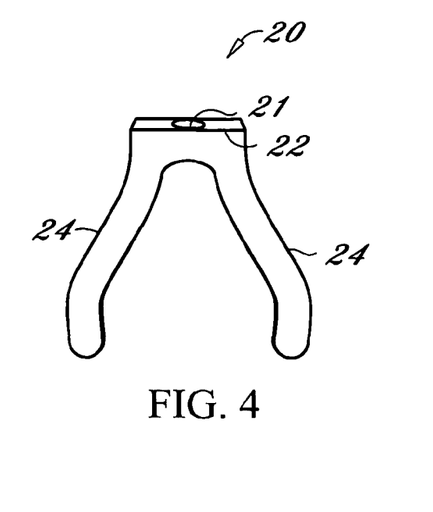
FIG. 4 is a partial perspective view of the alternative embodiment of the vehicle display bracket system in accordance with the instant invention.
Figure 5:
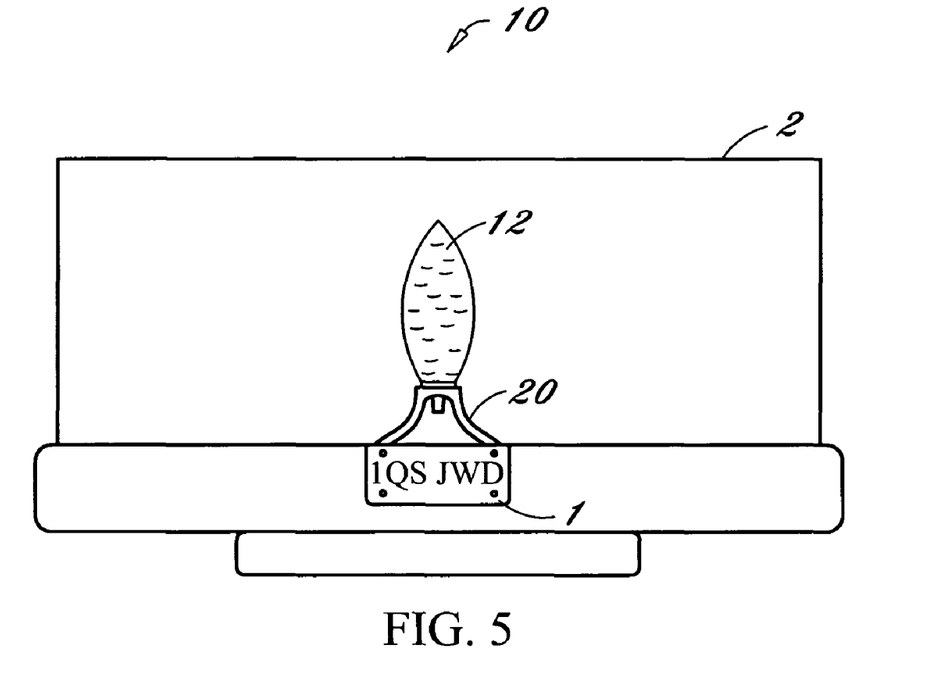
FIG. 5 is an elevational view of the alternative embodiment of the vehicle display bracket system mounted over a license plate in accordance with the instant invention.
Figure 6:
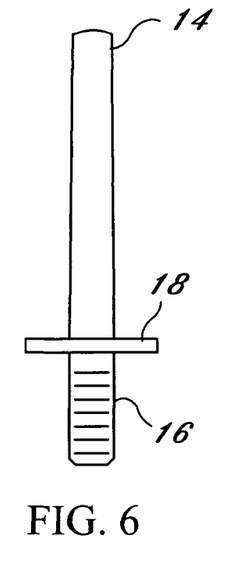
FIG. 6 is an elevational view of the alternative embodiment of the vehicle display bracket system's support rod in accordance with the instant invention.
Figure 7A:
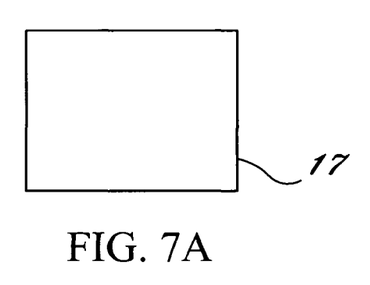
FIGS. 7A-7C are perspective and elevational views of the alternative embodiment of the vehicle display bracket system's adapter sleeve in accordance with the instant invention.
Figure 7B:
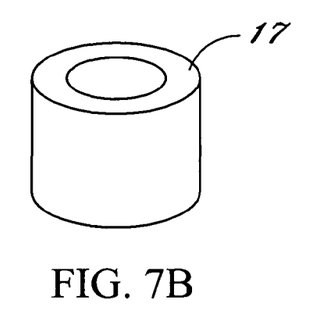
Figure 7C:
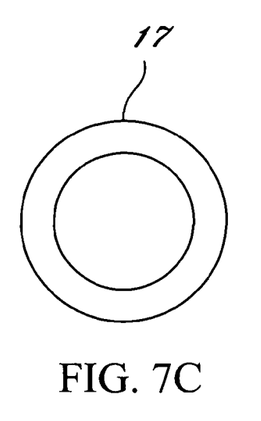

With reference to FIG. 6, the insert rod 14 is disposed in the ornamental structure 12 to support and stabilize the structure 12. The rod 14 comprises the threaded post 16 wherein the rod 14 is approximately sixteen and a half (16.5) inches long and ¾ inches in diameter and the post 16 is approximately two (2) to three (3) inches long and at least long enough to fit through the mounting aperture 21 and securely receive a fastener 19. The washer 18 is securely fixed to the rod 16 by welding or other comparable method. The washer 18 provides a stop and base for positioning and securing the ornamental structure 12. The bushing 17 may comprise rubber, plastic, PVC and metal based materials. The bushing 17 fits in the mounting aperture 21 and receives the post 16 in a manner that secures the post 16 and prevents it from bouncing around in the aperture 21. The post 16 fits through the bushing 17 in the mounting aperture 21 and is secured to the mounting platform 22 by mating the fastener 19, such as a nut, to the post 16. Alternatively, the ornamental structure 12 may comprise a threaded receptacle that receives a bolt-like fastener rod 14.

Figure 8A:
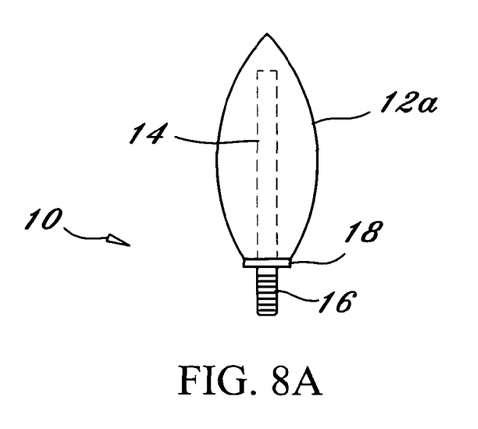
FIGS. 8A-8Q are elevational views of the preferred embodiments of the various design alternatives supported by the vehicle display bracket system in accordance with the instant invention.
Figure 8B:
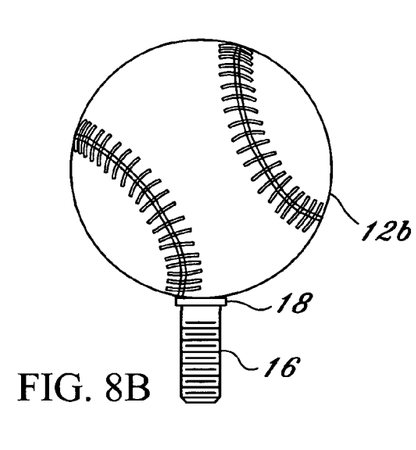
Figure 8C:
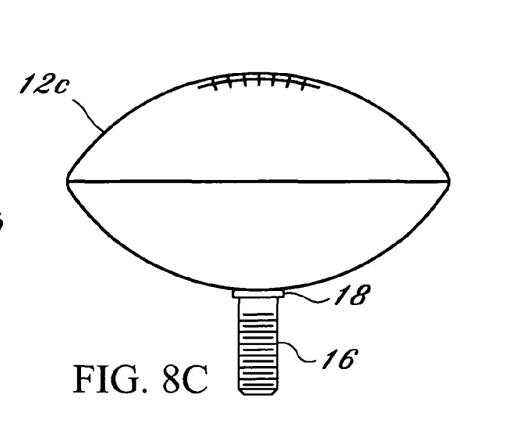
Figure 8D:
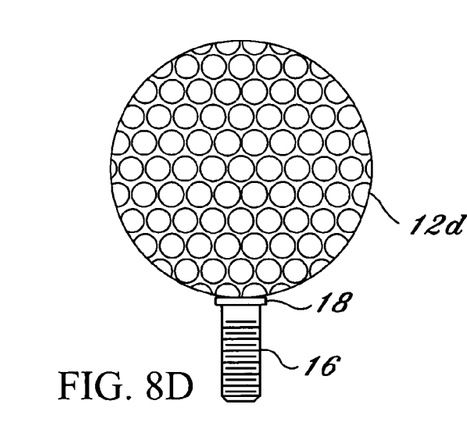
Figure 8E:
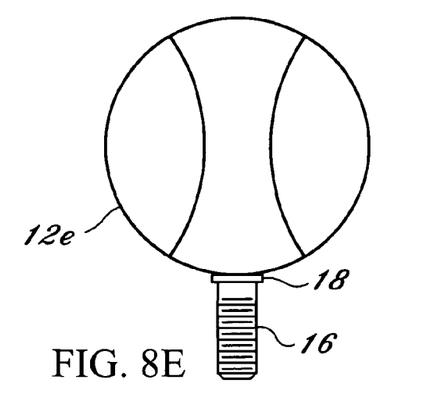
Figure 8F:
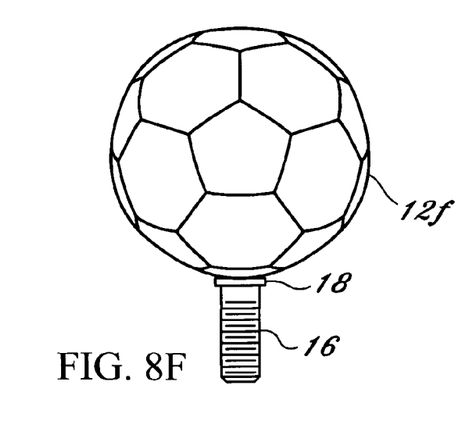
Figure 8G:
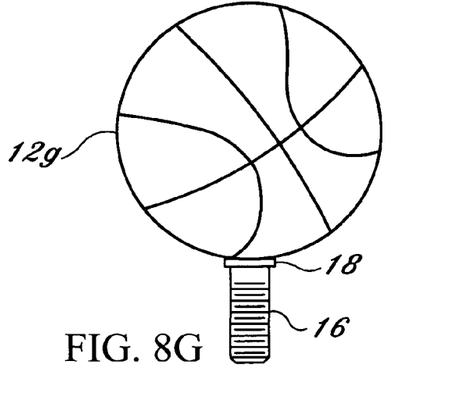
Figures 8H, 8I:
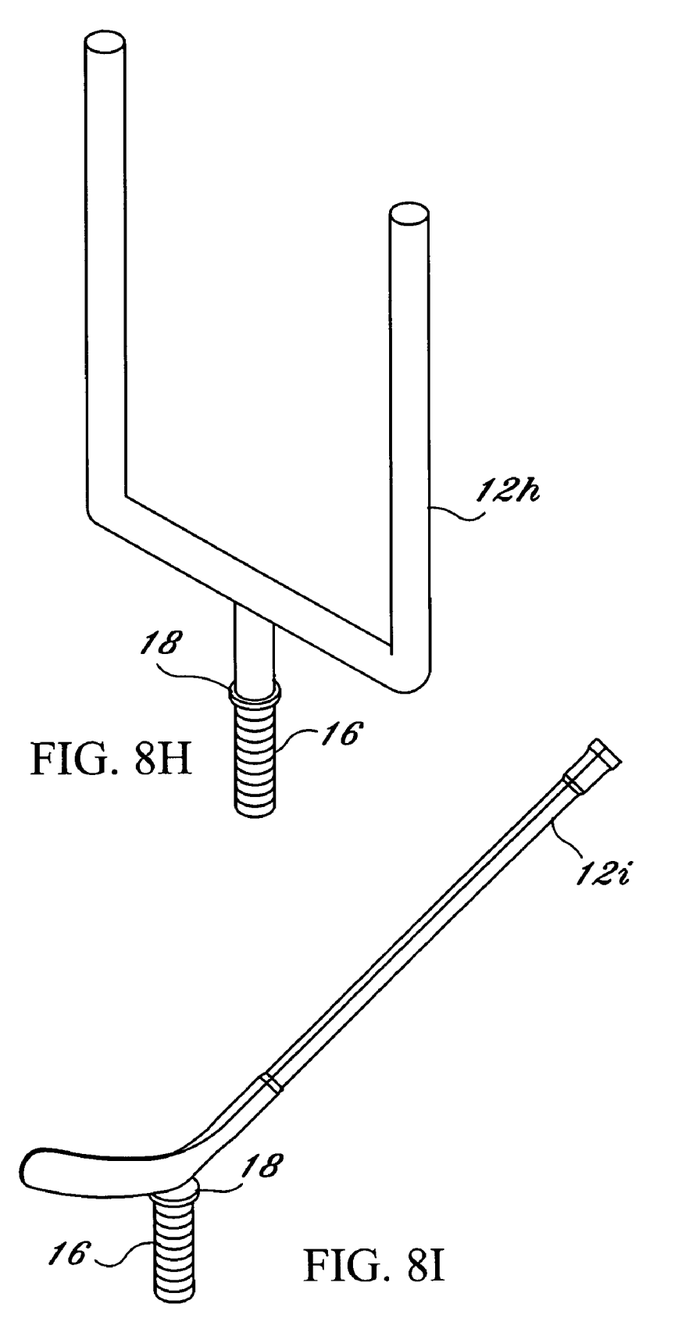
Figure 8J:
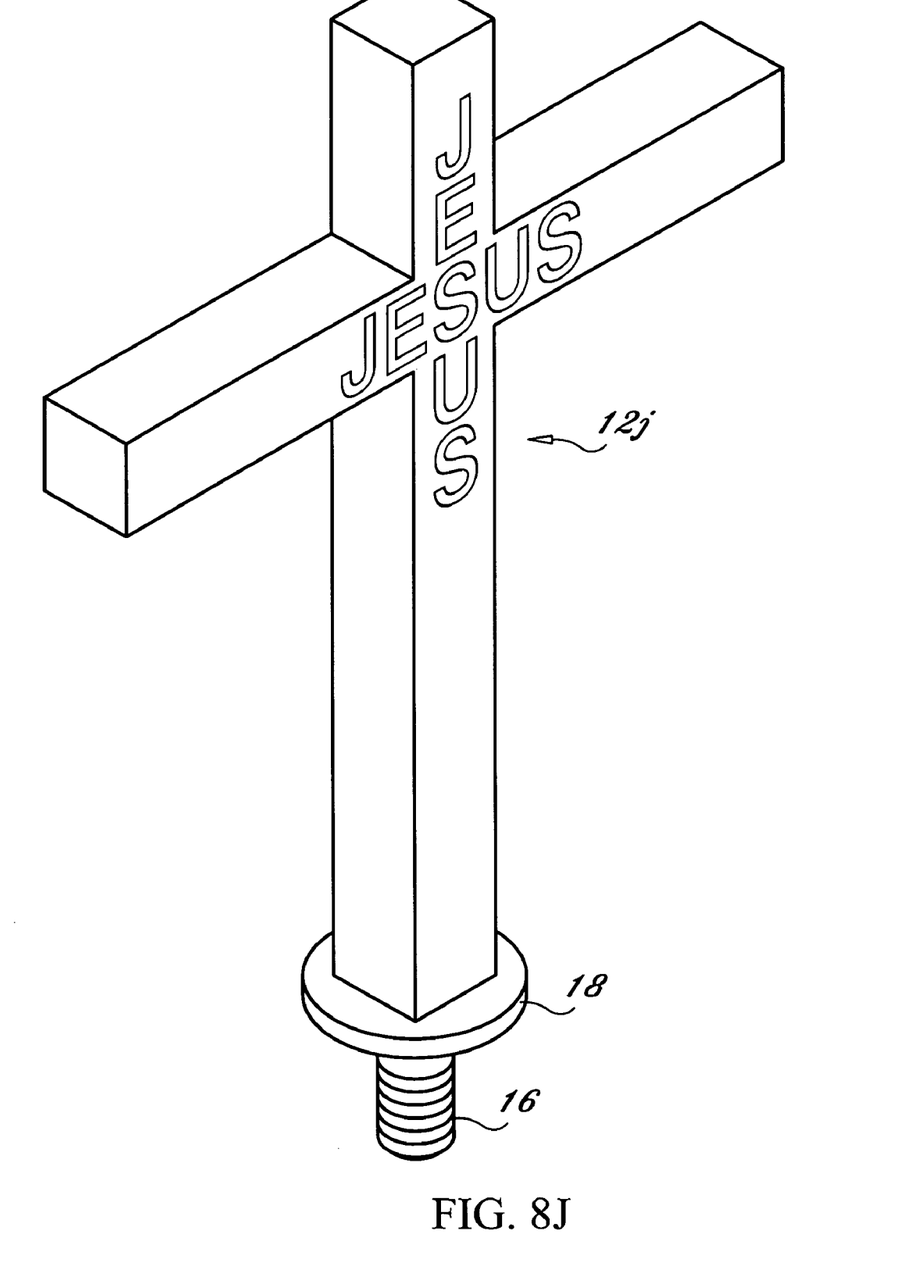
Figure 8K:
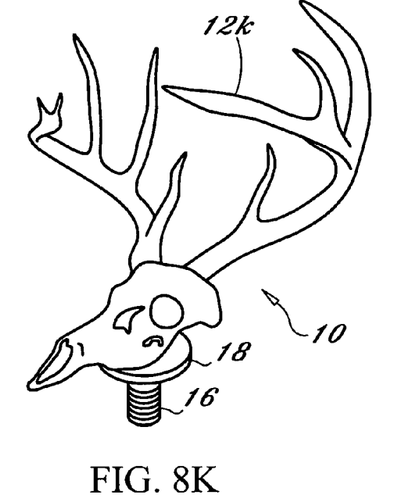
Figure 8L:
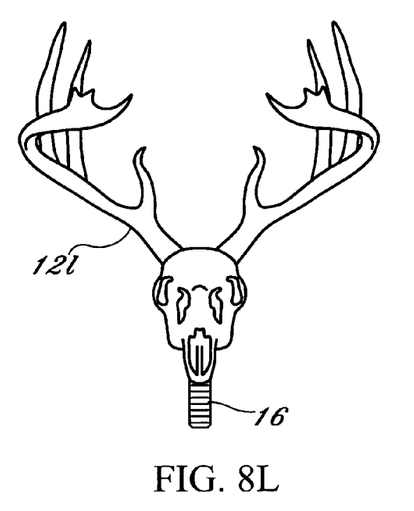
Figure 8M:
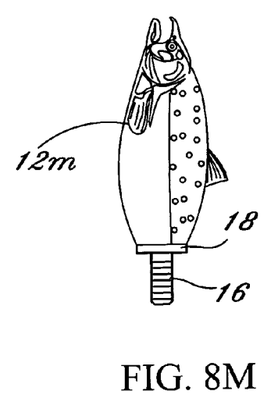
Figure 8N:
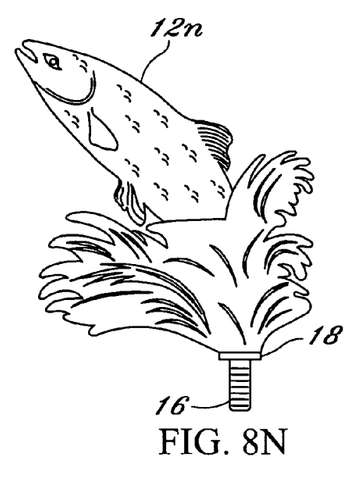
Figure 8P:
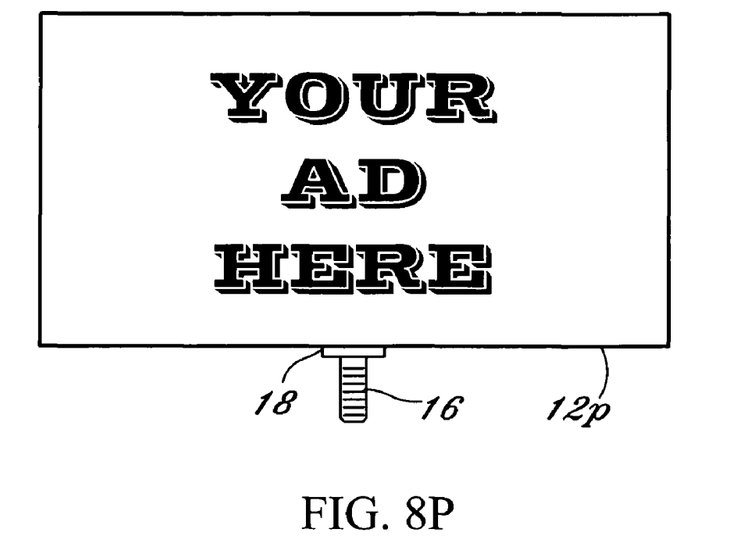
Figure 8Q:
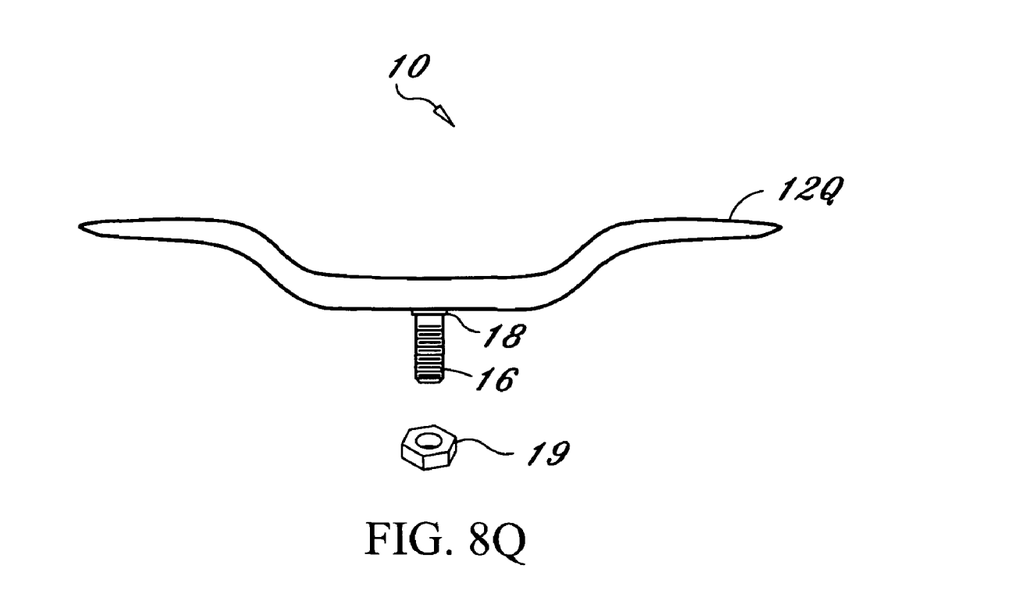
Figure 9A:
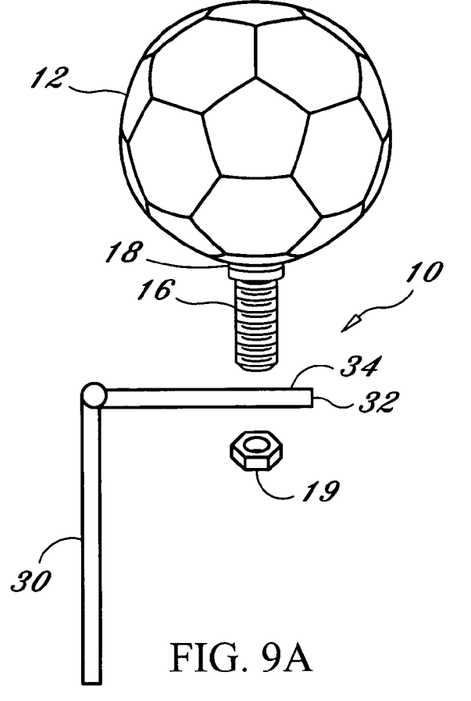
FIGS. 9A-9C are elevational views of the preferred embodiment of the vehicle display bracket system in accordance with the instant invention.
Figure 9B:
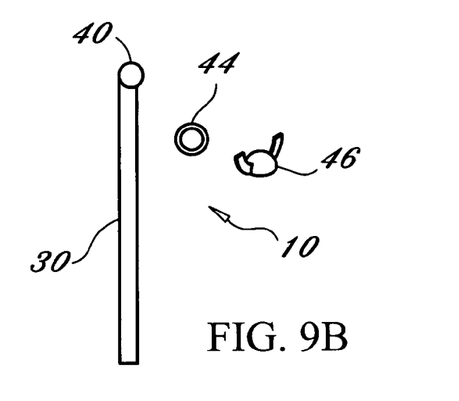
Figure 9C:
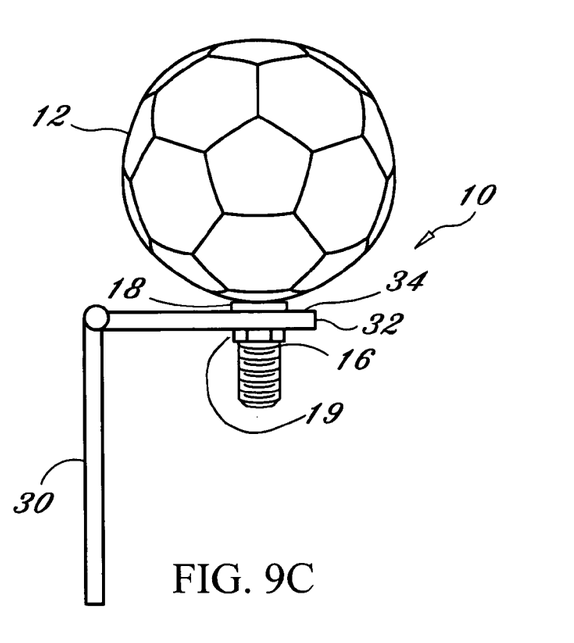
Figure 10:
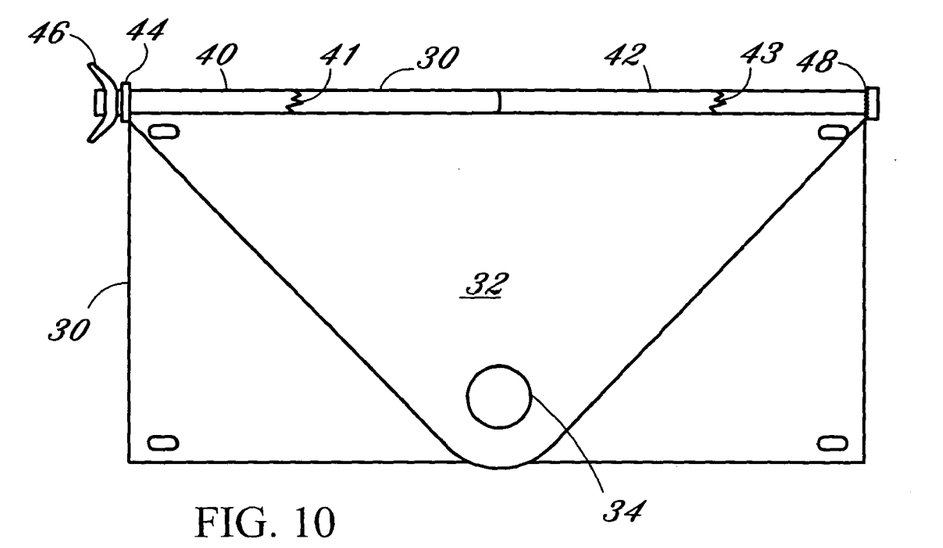
FIG. 10 is an elevational view of the preferred embodiment of the vehicle display bracket system in accordance with the instant invention.
Figure 11:
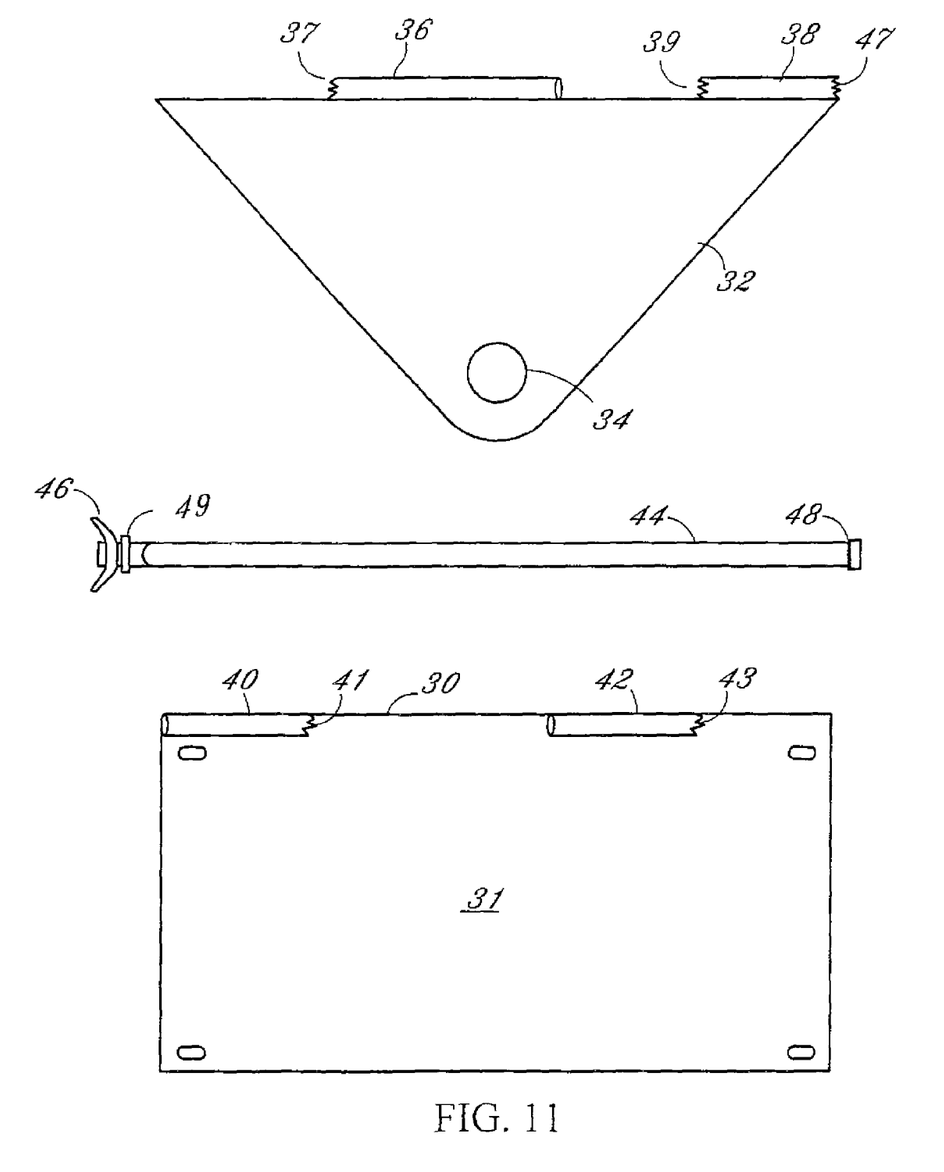
FIG. 11 is an exploded elevational view of an preferred embodiment of the vehicle display bracket system in accordance with the instant invention.

With reference to FIGS. 8A-8Q, the ornamental structure 12 comprises a variety of objects, shapes and sizes. The size of a typical ornamental structure 12, such as for a deer tail 12a, is approximately fifteen (15) to seventeen (17) inches in length, seven (7) inches in width and two (2) to three (3) inches in depth, however these dimensions may vary based on the size and type of ornamental structure 12. For instance, the ornamental structure 12 may comprise a deer tail 12a, baseball 12b, football 12c, golf ball 12d, tennis ball 12e, soccer ball 12f, basketball 12g, goal post 12h, hockey stick 12i, cross 12j, deer skull 12k, antlers 8l, fish 12m, jumping fish 8n, money design 12o or advertisement board 12p, as shown in FIGS. 8A-8P. The ornamental structure 12 may also comprise other shapes and objects. The ornamental structure 12, regardless of form, is secured to, molded around or adapted to receive the rod 14 having a depending mounting post 16 for mating with a securing fastener 22. The invention 10 and ornamental structure 12 may be manufactured from rubber, hardened rubber, plastic, thermoplastic latex, foam, stainless steel or similar materials.

The trophy fish 12n version of the ornamental structure 12 preferably comprises a 3-dimensional representation of a saltwater or freshwater game fish coming out of the water as it would if it were chasing a prey fish or fighting to shake a hook loose. The fish 12n preferably comprises a partial fish with its mouth open and coming out of a water-like base structure that simulates the look of water splashing. The appearance of the fish 12n may vary to create other types of fresh water and seawater fish. The dimensions of the fish 12n may vary depending on the type of fish. The fish 12n may comprise a few base designs that are painted differently to represent different game fish. The height of the fish designs 12n may be approximately eight (8) inches and the width approximately three (3) inches.

With reference to FIGS. 9A-11, the preferred embodiment of the vehicle display bracket system 10 comprises a bottom support plate 30, top plate 32 rotatably mounted to the bottom support plate, rod 44 and mounting aperture 34 defined by the top plate 32 for mounting any of the various ornamental attachments 12a-12Q shown in FIGS. 8A-8Q. The top plate 32 comprises a first hinge 36 having a plurality of gear teeth 37 at one end and a second hinge 38 having gear teeth 39 or 47 on one or both ends. The bottom plate 30 comprises a front surface 31 recessed approximately ⅛ of an inch, first hinge 40 having a plurality of gear teeth 41 at one end and second hinge 42 having a plurality of gear teeth 43 at one end. The bottom plate 30 is similar in size and shape to a conventional license plate and is mountable to a vehicle behind the license plate. The rod 44 holds the top and bottom plates 30, 32 together in a manner that facilitates rotation of the top plate 30 relative to the bottom plate 30.

Referring to FIGS. 9A-11, to install and use the preferred embodiment of the bracket 10, the bottom plate 30 is first secured to the vehicle like a license plate. The top plate 32 mounts to the bottom plate 30 wherein the top plate first hinge 36 resides between and engages the bottom plate's first and second hinges 40, 42 and the top plate second hinge 38 engages the outside end of the bottom plate's second hinge 42. The rod 44 is inserted through the hinges 40, 36, 42 and 38 and secured at one end by a wing nut 46 and washer 49. The opposite end of the rod 44 comprises a bolt-like head notched with gear teeth 48. The gear teeth 41, 37, 43, 39, 47 and, or 48 allow the top plate 32 to be fixed at any desired angle, such as parallel to the ground, to display an ornament 12 or compensate for the different clearances on a vehicle around the license plate and also serves to keep the top plate 32 in the selected position during vibrations, bumps and wind resistance. The alternative bracket 10 may comprise only one set of gear teeth, such as 41 and 37, 43 and 39, or 47 and 48.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. A vehicle display bracket system for mounting and displaying an ornament, said system comprising:
    a base plate mountable to a vehicle proximal an area adapted for mounting a license plate;
    a top plate rotatably mountable to said base plate;
    means for rotatably mounting said top plate to said base plate, said means for rotatably mounting comprising at least one sleeve on said base plate having a free end, at least one sleeve on said top plate having a free end, said sleeve on said top plate being oriented on said top plate so that said base plate free end and top plate free end are adjacently disposed when said plates are joined and an axle rod adapted for passing through said base plate and top plate sleeves in a manner that facilitates rotational movement of said top plate relative to said base plate;
    means for securing said top plate at a selected angle relative to said base plate;
    at least one three-dimensional ornament comprising means for removably mounting to said top plate; and
    said top plate comprising an aperture for facilitating the mounting of said ornament to said top plate.

2. A system as recited in claim 1, wherein said means for removably mounting said ornament to said top plate comprises:
    a rod depending from said ornament having a threaded end, said threaded end having dimensions that facilitate insertion through said top plate aperture; and
    fastener means for mating with said threaded end in a manner that secures said ornament to said top plate.

3. A system as recited in claim 1, wherein said means for securing said top plate at a selected angle relative to said base plate comprises:
    cooperating projections and grooves on said base plate end and said top plate end wherein projections on one of said sleeve ends engage grooves on the other one of said sleeve ends.

4. A system as recited in claim 1, further comprising a fastener means for securing said axle rod in said sleeves.

5. A system as recited in claim 1, wherein said ornament comprises a sports ball, sports equipment, goal posts, cross, antlers, fish, one or more words or a written message.

6. A system as recited in claim 1, wherein said ornament comprises a sports ball, sports equipment, goal posts, cross, antlers, fish, one or more words or a written message.

* * * * *